3,425,804
PRODUCTION OF MAGNESIUM HYDROXIDE
FROM AQUEOUS SOLUTIONS CONTAINING
MAGNESIUM AND BORON VALUES
Joel E. Rastrelli, Cape May, N.J., assignor to Dresser Industries, Inc., a corporation of Delaware
Filed Mar. 1, 1966, Ser. No. 530,935
U.S. Cl. 23—201        2 Claims
Int. Cl. C01f 5/22

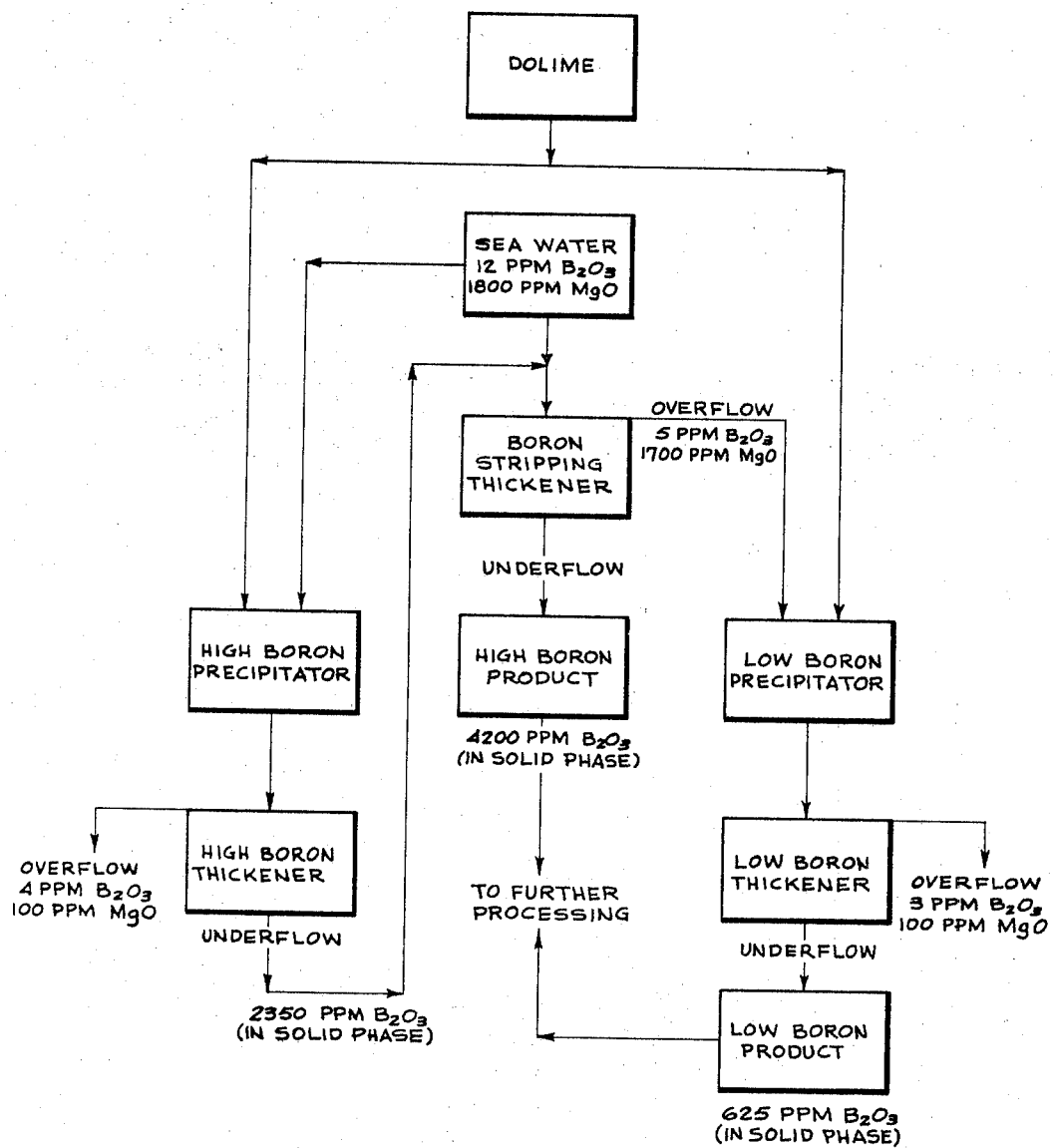

ABSTRACT OF THE DISCLOSURE

A method of recovering two classes of magnesium hydroxide from an aqueous solution of magnesium values in which boron values appear as a minor contaminant. The aqueous solution is divided into two streams, the first of such streams being treated to precipitate magnesium hydroxide while simultaneously adsorbing boron values thereon. The second stream is passed in an intimate association with the precipitated magnesium hydroxide of the first stream, removing boron values therefrom. The second stream is thereafter treated to precipitate the magnesium values therein, which precipitate is very low in boron values.

---

This invention relates to the production of magnesia from seawater and other aqueous solutions containing dissolved magnesian values. In a particular embodiment, it relates to a single continuous process of making two classes of magnesia from a single feed stock. The two classes of material are especially intended for the manufacture of dead burned magnesia grain of well developed periclase structure suitable for manufacture of two different classes or types of basic refractory shapes. The grain is preferably made according to the teachings of the United States patent to Snyder et al., No. 3,060,000.

It has quite recently been discovered that a particular type of subsidiary oxide or impurity can be useful and, in fact, highly desirable in the manufacture of one type of basic brick—but most undesirable when manufacturing another type of burned basic refractory brick. This particular impurity is boron.

In the manufacture of direct-bonded brick from a mixture of chrome ore and dead burned magnesia (for example. of the type disclosed and claimed in United States Patent No. 3,180,744 of Ben Davies and Frank H. Walther) it has been discovered that a minor (0.1% or so) amount of boron promotes the formation of the desired direct bond between the mineralogically dissimilar granular constituents, chrome ore and dead burned magnesia. See copending application Ser. No. 523,281 which issued as U.S. Patent No. 3,321,323. And yet, an equivalent amount of boron in dead burned magnesia used to make a burned all-magnesia shape tends to dramatically reduce the strength thereof. This latter fact is well established by the disclosure of copending application Ser. No. 483,356, of Ben Davies and Peter H. Havranek which issued as U.S. Patent No. 3,275,461.

It is therefore an object of this invention to provide a single process which produces two types or grades of magnesia, one being relatively low in boron and the other relatively high in boron.

In the process of this invention, incoming seawater, after any necessary pretreatment, is split into two streams. A first of these streams is directed to a high-boron content precipitator where soluble magnesium salts in the water are reacted with lime (CaO) or dolime (SaO·MgO), as shown in the equations:

(1)     $Mg^{++} + SaO + H_2O = Mg(OH)_2 + Ca^{++}$ or, (2)     $Mg^{++} + CaO \cdot MgO + 2H_2O = 2Mg(OH)_2 + Ca^{++}$ The resulting magnesium hydroxide slurry is thickened to separate it from most of the magnesium-depleted (spent) feed (for example, seawater). In this, a high-boron circuit, most of the boron in the incoming seawater is adsorbed on the particles of magnesium hydroxide precipitated and, thus, appears in the thickened product. Only a small part remains in the clear spent water overflowing this high-boron circuit thickener.

The other stream being introduced to the system is mixed with the thickened product of the high-boron precipitator and then directed to a boron-stripping thickener where solids are settled and removed as thickened underflow. This is probably the most important step in the process. Because of the tendency of magnesium hydroxide particles to adsorb boron, the previously precipitated high-boron content magnesium hydroxide is used to clean incoming seawater of its boron content. This cleaned seawater, which is the overflow from the boron-stripping thickener, is used as the second feed stream to a low-boron precipitator. As in the above described treatment of the first sream, lime (calcined limestone) or dolime (calcined dolomitic material such as dolomite) is used to precipitate the magnesium values in the low-boron stream. The magnesium hydroxide slurry which results has a considerably lower boron content as compared to untreated seawater.

The attached flow diagram clearly outlines the foregoing steps and further includes exemplary, but typical, indications of the concentration of boron and magnesium on an oxide basis, in the various process streams.

The product of the two streams is subsequently subjected to further processing, preferably in separate installations, for example, according to the process of United States Patent No. 3,060,000, to manufacture two grades or types of dead burned refractory-grade magnesia.

Having thus described the invention in detail and with sufficient particularity as to enable those skilled in the art to practice it, what is desired to have protected by letters patent is set forth in the following claims:

I claim:
1. A method of recovering two classes of magnesium hydroxide from an aqueous solution of magnesium values in which boron values appear as a minor contaminating constituent comprising:
   (1) dividing an incoming stream of said aqueous solution into two streams,
   (2) treating the first stream to precipitate the magnesium hydroxide with materials selected from the group SaO and MgO·CaO while substantially simultaneously adsorbing boron values on the magnesium hydroxide,
   (3) passing the second of said two streams in intimite association with the magnesium hydroxide precipitated from the first stream thereby substantially simultaneously removing boron values dissolved in said second stream,
   (4) separating said second stream from the magnesium hydroxide precipitated from the first stream,

(5) precipitating magnesium hydroxide from said second stream with materials selected from the group CaO and MgO·CaO, and (6) recovering a magnesium hydroxide slurry high in boron values from said first stream and a magnesium hydroxide slurry low in boron values from said second stream.

2. The method of claim 1 in which the magnesium values of the two streams are precipitated by passing in intimate association with calcined dolomite.

References Cited

UNITED STATES PATENTS 2,402,959   7/1946   Gustafson et al. _____ 23—201 X
3,232,708   2/1966   Chisholm _____ 23—201

EDWARD J. MEROS, *Primary Examiner.*

U.S. Cl. X.R.

106—58

UNITED STATES PATENT OFFICE
CERTIFICATE OF CORRECTION

Patent No. 3,425,804                                                February 4, 1969

Joel E. Rastrelli

It is certified that error appears in the above identified patent and that said Letters Patent are hereby corrected as shown below:

Column 2, line 2, "(SaO·MgO)" should read -- (CaO·MgO) --; line 5, the equation should read -- (1)    $Mg^{++}+CaO+H_2O=Mg(OH)_2+Ca^{++}$ --. Column 2, line 58, "SaO" should read -- CaO --.

Signed and sealed this 17th day of March 1970.

(SEAL)
Attest:

Edward M. Fletcher, Jr.                                  WILLIAM E. SCHUYLER, JR.
Attesting Officer                                                         Commissioner of Patents